United States Patent Office 3,597,389
Patented Aug. 3, 1971

3,597,389
MOISTURE RESISTANT DENTAL RESTORATIVE COMPOSITIONS
Charles W. Taylor, East Oakdale Township, Washington County, Minn., assignor to Minnesota Mining and Manufacturing Company, St. Paul, Minn.
No Drawing. Filed Mar. 15, 1968, Ser. No. 713,318
Int. Cl. C08f 43/04
U.S. Cl. 260—41                    4 Claims

ABSTRACT OF THE DISCLOSURE

Dental compositions are provided of inorganic particulate material as filler, tertiary aromatic amine as potential accelerator and, as vehicles or binders, methacrylate esters of aromatic or unsaturated lower aliphatic diacid hemiesters with di- or tri-primary diols or triols. Polymerization is initiated in these combinations by free radical generating catalysts to give products which have relatively low sensitivity to moisture and are usefully employed in dental cavities as fillings.

---

This invention relates to novel moldable dental compositions in which polymerization is initiated by free-radical generating catalysts. After initiation of polymerization in cavities in teeth, the polymerized compositions have better resistance to moisture than conferred by heretofore available materials adapted for filling teeth.

Dentists are becoming more and more cognizant of the psychological effect of the appearance of teeth, of the mechanical and psychological benefits derived from restorations and of the necessity for providing durable restorations. The most satisfactory generally useful fillings that have been developed are based on the use of combinations of readily polymerizable organic vehicle-binder together with combinations of fillers. With proper compositions it is now possible to provide mimetic fillings for anterior teeth and, with other combinations, to provide fillings matching the general tooth color for posterior teeth with relatively limited shrinkage on polymerization and favorable characteristics of thermal expansion. Little difficulty is experienced with such restorations where they are not subjected to severe mechanical attrition by mastication.

Under conditions of mechanical stress it is evident that compressive strength becomes a criterion of durability. It is found, however, that compressive strength is deleteriously affected under oral conditions of moisture when certain groups, particularly hydroxyl groups, are present in the polymer molecules. Hydroxyl groups present in such groups as hydroxypropylene groups

appear to result in relatively high moisture absorption by polymers containing such groups. Other aliphatic hydroxyl groups and even many active hydrogen containing groups are generally undesirable.

It is an aim of this invention to provide novel compositions suitable for dental applications comprising solid inorganic fillers and organic binders comprising monomers containing polymerizable methacrylate groups which are essentially devoid of active-hydrogen containing groups and peroxides, and which compositions, after polymerization, have compressive strengths of the order of 24,000 p.s.i. or more both initially after polymerization and after exposure to moisture at 37° C. or oral conditions for periods of 6 months and more.

It is another aim of this invention to provide compositions for filling teeth which have water absorption on prolonged exposure of 6 months or more at 37° C. below about 1 percent by weight.

Other objects will become evident from reading this application.

It has been found that especially valuable monomers free from active hydrogen atoms for the compounding of restorative compositions are the polyprimary carbinol polymethacrylates, which are formed by the esterification of primary hydroxyl terminated polyols. The unreacted hydroxyl groups of the polyol are converted to methacrylates to provide the useful binders of this invention which are devoid of active hydrogen atoms.

In order that polymerization of these compositions proceed rapidly after initiation an accelerator is included as part of the binder for the polymerization. The amounts are adjusted, as will be evident to those skilled in the art, so that initial setting is deferred for a few minutes, usually 3 to 5, after mixing. This provides the time for mixing, depositing in a tooth cavity and consolidating before curing or setting has advanced beyond a workable stage. Usually 0.5 to 2 mole percent of accelerate is dissolved in the binder. A more preferred proportion is about 0.2 to 0.5 weight percent for aromatic tertiary amines such as dimethyl-p-toluidine. It is thus desirable that the monomers be devoid of any peroxide compounds which may be present as artifacts in the preparation. A treatment with reducing agent prior to use is thus desirable. If this precaution is not taken shelf life may be very short.

The fillers employed in the compositions of the invention may include small amounts of pigments, either for visual color or fluorescent effect, glassy spherules or particles in small sizes, or crystalline materials such as lithium aluminum silicates, hydroxyapatite, etc. Particles should be generally smaller than 50 microns and preferably smaller than 30 microns. A commercially available lithium aluminum silicate is used in examples herein as providing an exemplary and generally valuable filler. As obtained particles range from submicron sizes up to 44µ with an average of about 2 to 15 microns. Other fillers may be used in somewhat different proportions and may have slightly different properties from the exact figures given.

It is preferred that the fillers be treated to promote adhesion by the binder, for example, using a conventional vinyl silane treatment or other such pretreatment.

It is found that the most satisfactory workable consistency for dental filling compositions is obtained when fillers having particle sizes in the average range of about 2 to 15 microns are milled with organic binder containing about 0.5 to 2 mole percent of tertiary amine accelerator (and including any diluent which may be desired) in proportions of about 72 to about 78 percent by weight of filler and 28 to 22 percent of binder. The preferred range is 74.3% to 78% of filler. In both cases the lower percentages are used with more viscous binders. The exact proportions may be varied depending on individual preferences, temperature requirements, etc. It should be recognized that adding the small amount of catalyst and solvent therefor which initiate polymerization may reduce the consistency of the mixture, but this is rapidly restored by rapid gelation.

Mixing of binder and filler may be by any convenient method and desirably with as little occlusion of air bubbles as possible. Milling or kneading by generally available procedures provides adequate blending. Ball-milling may be less desirable when a spherular filler is included. It is also desirable to avoid inclusion of air during spatulation with catalyst before actually placing the polymerizing compositions in dental cavities.

It is not necessary that polycarbinol polymethacrylates be limited to those in which there is one dibasic acid residue. They may include none or larger polyester chains in which one or more diol residues are interposed between dibasic acid residues up to the point where the viscosity is not over about 10,000 centipoises. A low concentration of methacrylate groups (milliequivalents per gram of ester) is advantageous in decreasing shrinkage on polymerization although somewhat adversely affecting compressive strength. In general, therefore, the polyester methacrylate esters preferably do not have a very low molecular weight.

The polycarbinol polymethacrylate may be obtained by reaction of any type of intermediate, for example, a di- to tri-chloromethylated diphenyl ether may be converted to a polycarbinol polymethacrylate:

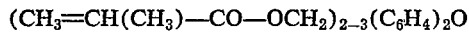

in which substituents are at least in the 4 and 4' positions and may include further substituents in a 2 position. The simple compound may be named 4,4'-bis methacrylate-oxymethyl-diphenyl ether.

A diol alone or with a triol may be partially reacted with a diacid and the residual carbinol groups then esterified by methacrylic acid or the diol and triol may be reacted separately. The resulting products are polyester methacrylate esters and are presently preferred as binders. In order to be assured of freedom from unesterified hydroxyl groups and hence of active hydrogen atoms all hydroxyl groups in diols and triols are present in primary carbinol groups —$CH_2OH$.

Crystalline polyester methacrylates are generally avoided. For example, the dimethacrylate of isophthalic acid bisdiethylene glycol hemiester tends to crystallize and it is preferable to include some terephthalic acid in the reaction. The corresponding orthophthalate is fluid and is quite satisfactory. The preparation of the latter is known from British Pat. 595,881 and also from the review article in Soviet Plastics vol. 12, page 9 (1965) by Berlin et al. Modification is also possible by inclusion of more than one species of glycol, for example, a small amount of ethylene glycol together with diethylene glycol, or inclusion of up to about 50 mole percent of a lower triol.

The polyester methacrylate esters which are particularly useful in dental restorative compositions of the invention are represented by the general formula

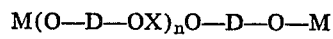

wherein M is methacrylate, D is alkylene of 2 to 8 carbon bis methylene cycloalkylene or 3-oxa-pentylene, $n$ is 1 to 2 and X is the residue of a diacid mono- or binuclear aromatic dicarboxylic acids of 8 to 19 carbon atoms and unsaturated dibasic aliphatic acids of up to 5 carbon atoms. Some exemplary acids are phthalic, isophthalic, terephthalic, fumaric, itaconic, benzophenonedicarboxylic, resorcinol diacetic, bisphenol A diacetic acid. Substituents which are present in the esters do not contain active hydrogen atoms. These polyester methacrylate esters have the further advantage of being of relatively low toxicity as demonstrated by tests in rabbits' eyes. They are therefore less likely to cause irritation of the pulp or nerve of a tooth.

It will be recognized that the methods of esterification used for preparation which do not form part of this invention are expected to provide materials of the stated structure but that other materials may be formed at the same time which may also contribute to the usefulness of these materials. For example, molecules in which $n$ is 1 and 2 may be formed in one reaction giving a useful mixture in which $n$ averages between 1 and 2.

In one aspect of the invention it is desirable to use two or even more different glycols or to combine esters of two or more different glycols. This assists in decreasing crystallinity. In such cases all of the D's in a molecule will not be identical.

In another aspect of the invention viscosity of esters is increased by employing from a few percent up to 50 mole percent or more of a low molecular weight triprimary triol, such as trimethylolpropane and esterifying all hydroxyl groups by forcing the reaction if necessary. Structural formulae of mixed polyesters including such triol nuclei are very difficult to demonstrate but, where T is the nucleus of a triprimary triol, the structure in certain cases may be $[M(O—D—O—)_nX—O—D—O—]_3T$ where X, D, M and $n$ have the above meanings. Several variations are possible depending on the sequence of reactions.

The general method of preparation is to esterify one mole diacid (anhydride, diacid halide or free carboxylic acid) with two moles of glycol in the presence of about 3% or less by weight of p-toluenesulfonic or other strong acid, about 0.6% of an inhibitor such as hydroquinone and sufficient toluene (about 200 ml. per mole of acid) to provide a reflux temperature of 125–150° C. Modifications will be readily apparent. The mixture of acid or anhydride and glycol is refluxed using a Barrett trap and a steady stream of nitrogen is maintained. After about 2 hours no further water is collected. The reaction mixture is cooled slightly and about 2.2 moles (10% excess) of methacrylic acid is added. Heating is continued, using a low stream of air to inhibit polymerization, for about 2 hours during which time a further two moles of water collects.

The mixture is cooled and toluene removed at 40° C. at 20 mm. of Hg pressure. The residue is taken up in ether, washed with dilute alkali and acid and then washed neutral using brine. The solution is dried, about 0.5% of bisphenol A is added as polymerization inhibitor and ether is removed. The polyester methacrylate is obtained as a viscous oil. As noted, reduction by a convenient method is desirable to be certain that peroxides are destroyed. Table I lists the properties of various useful polycarbonol polymethacrylate binders in all of Examples 1 to 15 except Example 9, the value of $n$ of the polyester methacrylate esters is 1. In that Example it is 2. In Examples 7 and 10 the different glycols are used in equimolar proportions in the initial reaction mixture. Example 16 particularly illustrates a polycarbinol polymethacrylate in which there are no intervening polyester groups.

TABLE I.—DIMETHACRYLATES

| Ex. | Polycarbinol nucleus | | Brookfield viscosity, cps. | α, β unsat., meq./g. | H₂O absorption not filled 3,600 hours 37° C. in percent |
|---|---|---|---|---|---|
| | Acid | Glycol | | | |
| 1 | Phthalic | Ethylene glycol | 450 | 6.0 | |
| 2 | Fumaric | Diethylene glycol | 80 | 6.88 | 1.94 |
| 3 | Phthalic | 1,4-butanediol | 220 | 4.57 | |
| 4 | 2,4' benzophenone dicarboxylic | Diethylene glycol | 250 | 5.05 | 1.89 |
| 5 | Itaconic | do | 54 | 6.90 | 2.87 |
| 6 | Isophthalic [1] | do | 240 | | |
| 7 | do | Diethylene glycol; 1,1,1-trimethylolpropane | 5,400 | | |
| 8 | Phthalic | Diethylene glycol | 156 | 4.40 | 1.87 |
| 9 | do | do | 1,940 | 2.61 | 0.81 |
| 10 | do | 1,4-cyclohexane dimethanol; 1,6-hexanediol | 486 | 3.57 | |
| 11 | do | 1,4-cyclohexane dimethanol | 9,120 | | |
| 12 | do | 1,6-hexanediol | 160 | 3.96 | |
| 13 | Bisphenol A diacetic | Diethylene glycol | 3,920 | 3.43 | |
| 14 | Itaconic | Cyclohexane-1,4 dimethanol | 900 | | 3.34 |
| 15 | Resorcinol diacetic | 1,6-hexanediol | 250 | | |
| 16 | 4,4'-dimethylol diphenyl ether [2] | | 540 | 5.9 | [2] 1.82 |

[1] A few percent of terephthalic acid effectively suppresses crystallinity.
[2] Including some of the 2,4,4'-trimethyl triacrylate; H₂O absorption for 2,400 hours at 60° C.

The corresponding acrylates are also useful as binders in compositions of the invention.

A tabulation of water absorption at 37° C. is included in Table I for various unfilled polymers. Low water absorption of an unfilled polymer is reflected in low water absorption in the corresponding compositions of the invention. It can be measured without the necessity of actually blending in accelerator and filler. Although no exact correlation is possible between water absorption of unfilled polymers and that of the compositions of the invention, it is generally desirable that the unfilled polymer have a water absorption less than about 3.5% at 37° C. in 5 months.

A preferred class of polycarbinol polymethacrylate are those in which the polycarbinol nucleus includes aromatic rings.

It will be recognized that at low water absorption values a number of factors may significantly influence quantitative measurement of water absorption. For example, it may be lowered by leaching of even relatively small amounts of unreacted or soluble components from the cured composition; it may be increased by absorption of water in the inorganic filler, etc. Oral conditions to which dental fillings are subjected are normally 37° C. and very moist and it is preferable to conduct tests under those conditions. Clearly, exposure for only seven days (168 hours) as described on silicate cements in Guide to Dental Materials, American Dental Association, 2nd edition, page 34 (1964) is no real challenge to materials which have low water absorption and do not contain large amounts of soluble components. Accordingly compositions of this invention and polymers associated therewith are tested for protracted times of the order of weeks, months or even years at 37° C. Accelerated testing is carried out by exposure to moisture at elevated temperatures. A temperature of 60° C. is convenient and is sufficiently high to effect absorption rapidly without being so high as to materially increase the probability of chemical reactions such as hydrolysis.

For purposes of comparison, the combination of binder and filler, i.e., the compositions of the invention, are compared to a composition of essentially the same type in which the binder is a glycidyl methacrylate adduct of Bisphenol A exemplifying prior art binders including free hydroxyl groups. The compositions are prepared using a commercial lithium aluminum silicate said to be formed by calcination of petalite and therefore comprising a mixture in essentially undeterminable proportions of unreacted petalite, beta-spodumene and quartz. A small jar of about 100 ml. capacity is charged with 74.3 g. of lithium aluminum silicate and 25.7 g. of the particular binder free from peroxides but containing about 0.2 to 0.5 percent by weight of an aromatic accelerator such as dimethyl-p-toludene. About 16 steel balls (about 3.5 to 4.0 g. each) are included to assist in milling. On a larger scale these might be omitted or they may be replaced by ceramic balls which cause somewhat less coloration. The bottle is rolled at about 1 r.p.m. for from about 16 to about 36 hours depending on the viscosity of the particular binder. Very high viscosities require the longer times.

Polymerization is brought about by combining 1.5 g. of the polymerizable combination with a drop (about 0.04 g.) of a free radical catalyst solution of about 4% benzoyl peroxide in methyl methacrylate (about 28%) and methacrylic acid (about 68%). The exact catalyst solution is not critical although the exact proportion is adjusted to give desired polymerization time. Mixing is effected using a spatula and material is immediately loaded into a suitable mold. Test samples for convenience are cylindrical samples about 6.2 mm. in diameter and 9.3 mm. long. The same compositions after addition of catalyst are readily used for filling cavities prepared in teeth. As a precaution, in vivo fillings should be placed over a cavity lining material if possible.

Tests are run on certain of the compositions of the examples of Table I at 37° and 60° C. as shown in the following table.

TABLE II.—WATER ABSORPTION IN PERCENT ON POLYMERS FILLED WITH 74.3% LITHIUM ALUMINUM SILICATE

| Binder of Example: | 3,600 hours at 37° C. | 3,144 hours at 60° C. |
|---|---|---|
| 5 | | 1.39 |
| 8 | 0.08 | 1.50 |
| 10 | 0.55 | 0.62 |
| 12 | 0.18 | |
| 16 | [1] 0.5 | |
| Control [2] | 4.5 | 7.74 |

[1] 170 hours at 60° C.
[2] Adduct of glycidyl methacrylate and Bisphenol A.

Further comparisons are made particularly using the above glycidyl methacrylate adduct of bisphenol A as control and the above polyester methacrylate of Example 8. Compressive strengths and water absorption are compared as shown in the following table.

TABLE III.—COMPARATIVE PROPERTIES

|  | Glycidyl methacrylate-bisphenol A adduct | Diethyleneglycol phthalate bismethacrylate |
|---|---|---|
| Compressive strength, filled with 74.3% lithium aluminum silicate: | | |
| Initially | 28,000 | [1] 30,270 |
| After 4,800 hours in water at 37° C | 16,600 | 27,000 |
| Water absorption at 37° C.: | | |
| Unfilled: | | |
| 600 hours | 3.61 | 1.62 |
| 2,500 hours | 3.8 | 1.8 |
| Filled: | | |
| 600 hours | 1.4 | 0.0 |
| 1,580 hours | 3.1 | 0.0 |

[1] At 78% filling the compressive strength is 31,600. The corresponding bisacrylate at 74.3% filling has an initial compressive strength of 26,530.

While the polycarbinol polymethacrylates are a preferred class of organic binders for the dental restorative compositions of this invention, the polycarbinol polyacrylates are also useful as indicated hereinbefore.

What is claimed is:

1. A stable, moldable dental restorative composition having, after hardening and exposure to moisture, moisture absorption of less than 1% by weight, said composition comprising, in percent by weight, based on a total of 100%, about 72 to about 78% of glassy or crystalline inorganic particulate filler and about 28 to about 22% of liquid polymerizable organic binder, substantially free from active hydrogen atoms and devoid of peroxides consisting essentially of polycarbinol polymethacrylate or polyacrylate represented by the formula:

$$M(O-D-OX)_nO-D-O-M$$

wherein M is methacrylate or acrylate, D is alkylene of 2 to 8 carbon atoms, bismethylene-cycloalkylene or 3-oxapentylene, $n$ is 1 to 2 and X is the residue of a diacid selected from the group consisting of mono or binuclear aromatic carboxylic acids of 8 to 19 carbon atoms and unsaturated dibasic aliphatic acids of up to 5 carbon atoms.

2. The composition of claim 1 wherein said binder includes as part thereof 0.5 to 2 mol percent accelerator for free radical polymerization.

3. The composition of claim 2 wherein said accelerator is an aromatic tertiary amine.

4. The composition of claim 2 wherein said binder is a polycarbinol methacrylate having at least one aromatic ring in the polycarbinol nucleus interconnecting the methacrylate groups.

References Cited

UNITED STATES PATENTS 3,336,418   8/1967   Dill _____ 260—475UN

MORRIS LIEBMAN, Primary Examiner

T. MORRIS, Assistant Examiner

U.S. Cl. X.R.

260—89.5